No. 786,424. PATENTED APR. 4, 1905.
H. H. CUTLER.
SYSTEM FOR CONTROLLING ELECTRIC MOTORS.
APPLICATION FILED JULY 6, 1903.
2 SHEETS—SHEET 1.
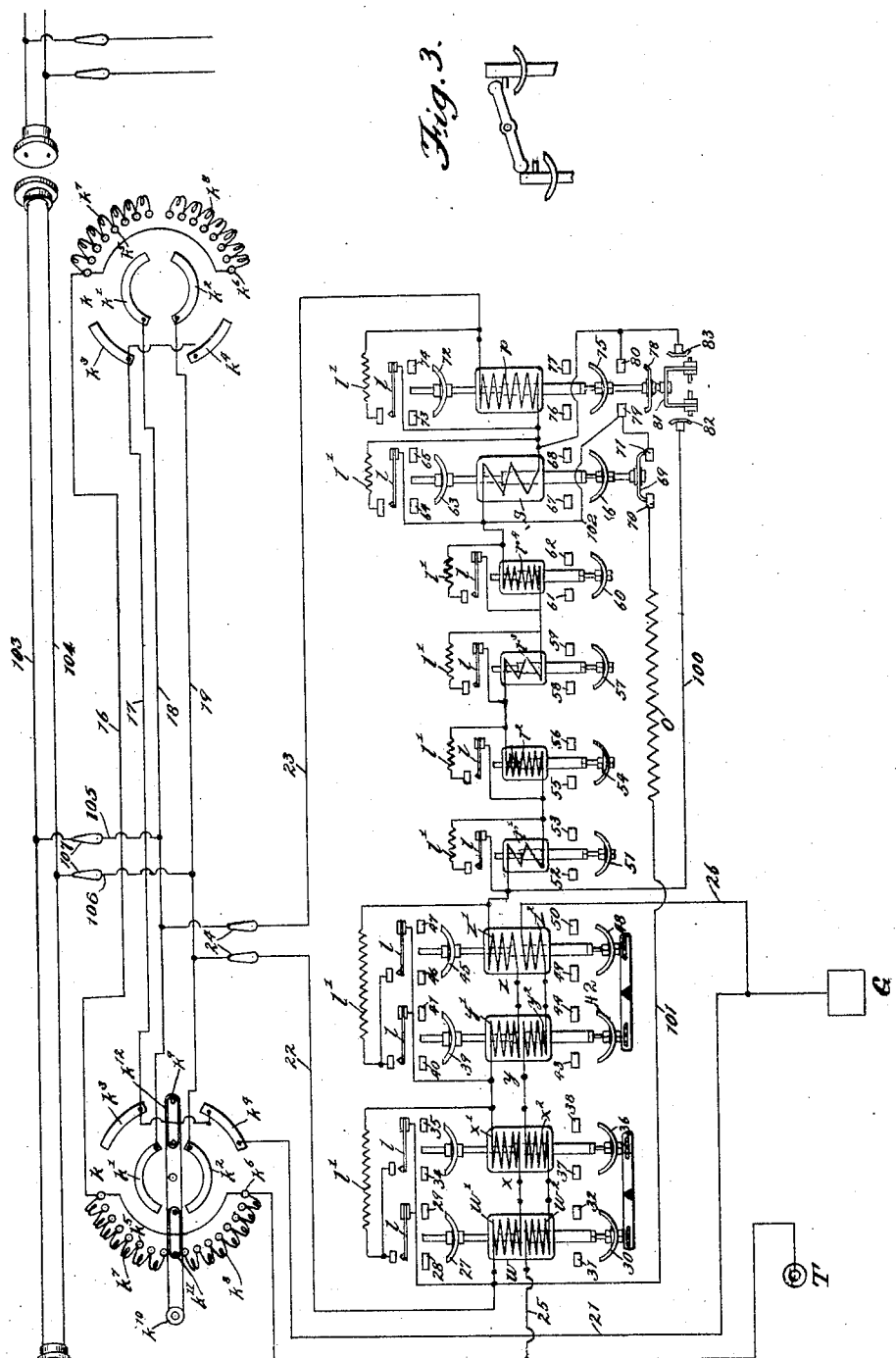

No. 786,424. PATENTED APR. 4, 1905.
H. H. CUTLER.
SYSTEM FOR CONTROLLING ELECTRIC MOTORS.
APPLICATION FILED JULY 6, 1903.
2 SHEETS—SHEET 2.
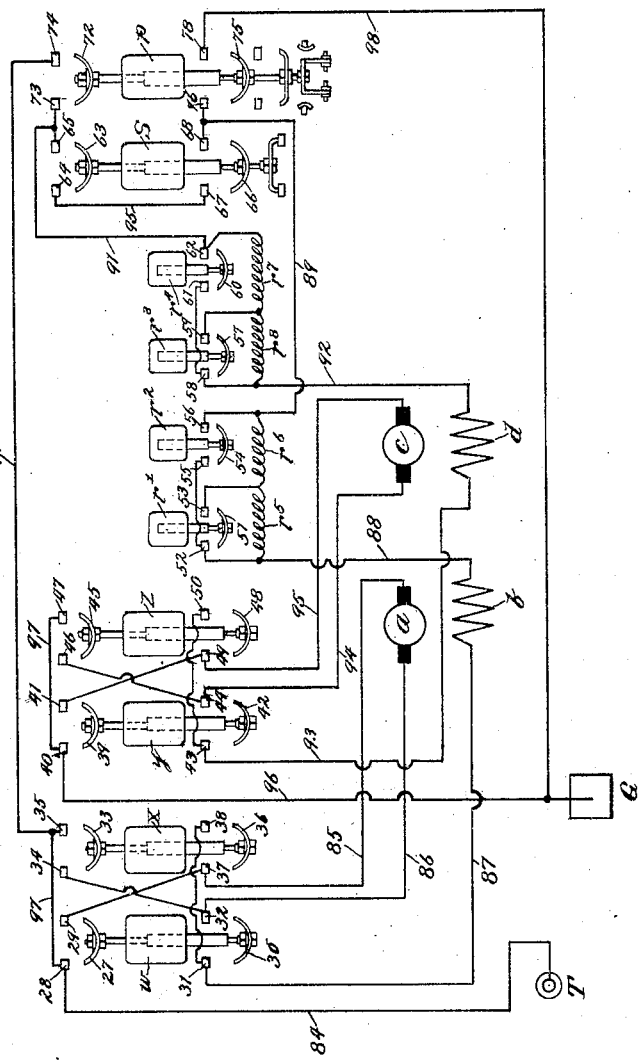

No. 786,424.

Patented April 4, 1905.

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

SYSTEM FOR CONTROLLING ELECTRIC MOTORS.

SPECIFICATION forming part of Letters Patent No. 786,424, dated April 4, 1905.

Application filed July 6, 1903. Serial No. 164,380.

*To all whom it may concern:*

Be it known that I, HENRY H. CUTLER, a citizen of the United States, residing at Milwaukee, in the county of Milwaukee and State of Wisconsin, have invented a certain new and useful Improvement in Systems for Controlling Electric Motors, of which the following is a full, clear, concise, and exact description, reference being had to the accompanying drawings, forming a part of this specification.

My invention relates to a system particularly designed for controlling electric motors; and it is a modification of the system disclosed in my application filed April 15, 1903, Serial No. 152,701.

The system permits the actuation of the controller for the electric motor from a distant point, and therefore it is appropriate for controlling the operation of electric motors which propel electric vehicles and for operating a train of cars upon the multiple-unit plan.

The preferred embodiment of the present invention employs a plurality of electromagnetic windings which are adapted to repond to currents of different amperes and which are connected in series in a controlling-circuit. These windings operate the elements of an electric-motor controller or other suitable instrumentalities. The amperage of the current delivered to the controlling-circuit is varied through the agency of suitable means to selectively actuate the electromagnetic windings, and thus operate the elements of the electric-motor controller.

One system which I have worked out for the purpose of disclosing my invention is illustrated diagrammatically in the accompanying drawings. In these drawings I have separated the controlling-circuits from the power-circuits in different figures, and the views in said drawings are as follows:

Figure 1 is a diagrammatic view of the car or controlling circuit with certain of the instrumentalities actuated by the electromagnetic windings included in said circuit. Fig. 2 is a diagrammatic view of the power-circuit for the electric motors and the switches for said circuit, which are controlled by the electromagnetic windings on the controlling-circuit above mentioned. Fig. 3 is a diagrammatic view of one form of interlocking lever for the series-parallel switch.

In Fig. 1, to which I will first refer in describing my invention, is shown the complete equipment of a single car. This circuit arrangement is duplicated in each of the cars, and therefore its use in operating a train of cars on the multiple-unit plan will be readily appreciated in the light of the description of the system which follows. At each end of the car is preferably situated a controller $k$, which may be of any form. The controller illustrated herein has segments $k'$, $k^2$, $k^3$, and $k^4$, and two sets of contacts $k^5$ and $k^6$, respectively. Between the sets of contacts $k^5$ are connected the sections of the resistance $k^7$, and between the series of contacts $k^6$ are connected the sections of resistance $k^8$. An arm $k^9$, having handle $k^{10}$, is centrally pivoted, so that it is movable over said contacts or segments, and carries brushes $k^{11}$ and $k^{12}$. The arm normally rests in what is termed the "central position," as shown, and when it is in such position the series of contacts $k^5$ and segments $k'$ and $k^3$ are situated upon one side of said arm, while the other series of contacts $k^6$ and segments $k^2$ and $k^4$ are situated on the other side thereof. The brushes carried by said arm are disposed to engage the segments and the contacts, and when said arm is moved by the handle in the direction indicated by the arrow the brush $K^{11}$ will connect the contacts $k^5$ with the segment $k'$, while the brush $k^{12}$ will connect the segments $k^2$ and $k^4$; but if the arm be moved in the reverse direction then the brush $k^{11}$ will connect the contacts $k^6$ with the segment $k^2$, while the brush $k^{12}$ will bridge segments $k'$ and $k^3$. The two controllers are connected by four wires 16, 17, 18, and 19, which in practice would preferably be formed into a single cable. The wire 16 connects the contact of each resistance which is farthest removed from the brush $k^{11}$ when the controller-arm is at its initial position with the same contact of each of the other resistances. The segments $k^3$ and $k^4$ of each controller are all connected by the wire 17. The segments $k'$ and $k'$ of the two controllers are connected by the wire 18, while the segments $k^2$ and $k^2$ are connected by the wire 19. The last contact of the resistance $k^8$ is connected by the wire 20 with trolley T, and the segment $k^4$ is connected with the ground G by the wire 21. Between the wires 18 and 19 is connected the car or controlling circuit comprising the wire 22, which is connected with the wire 19, and the wire 23, which is connected with the wire 18. Suitable switches 24 are preferably arranged in the car or controlling circuit, so that the said circuit may be disconnected from the controllers, if desired.

By reference to Fig. 2 it will be noted that the two motors are shown, one of which has armature $a$ and field $b$, while the other has armature $c$ and field $d$, and therefore a reversing-switch is provided for each of said motors, as well as separate resistance-switches.

With reference to Fig. 1 the solenoids $w$ and $x$ control the reversing-switches for the motor-armature $a$, while the solenoids $y$ and $z$ control the reversing-switches for the motor-armature $c$. The solenoids $r'$ and $r^2$ control the sections of resistance for the armature $a$, and the solenoids $r^3$ and $r^4$ control the switches for the sections of resistance for the armature $c$. The switches for controlling the series and parallel relations of the two motors in circuit have the solenoid $s$ for actuating the series switch and the solenoid $p$ for operating the parallel switch. The solenoids $r'$, $r^2$, $r^3$, and $r^4$ are differently wound, so that solenoids $r'$ and $r^3$ will operate their switches under a lower amperage than the solenoids $r^2$ and $r^4$.

The solenoids for the reversing-switches each preferably have an upper winding, which is coarse, and a lower winding, which is fine. The solenoid $w$ has coarse winding $w'$ and fine winding $w^2$, and the solenoid $x$ has upper coarse winding $x'$ and lower fine winding $x^2$. So, also, the solenoid $y$ has upper coarse winding $y'$ and lower fine winding $y^2$, and similarly the solenoid $z$ has upper coarse winding $z'$ and lower fine winding $z^2$. The fine windings $w^2$ $x^2$ $y^2$ $z^2$ of the solenoids of the reversing-switches are preferably connected in series between the wires 20 and 21 by wires 25 and 26, so that they are constantly supplied with current from the trolley T and the ground G. The coarse windings $w'$, $x'$, $y'$, and $z'$ of the solenoids of the reversing-switches, the solenoids $r'$, $r^2$, $r^3$, and $r^4$ of the resistance-switches, and the solenoids $s$ and $p$ of the series-parallel switches are all connected in series between the opposite sides of the controlling-circuit. So, therefore, the fine windings of the solenoids of the reversing-switches are constantly supplied with current from the main line, while the coarse windings of said solenoids are supplied with current from the controlling-curcuit. The two windings of each of the solenoids of the reversing-switches are preferably such that when the current is flowing therethrough their magnetizing effect is equal.

As just stated, the fine or lower windings of the solenoids of the reversing-switches are constantly supplied with current from the main line, and therefore the flow of the current therein is always in the same direction; but the direction in which the current flows through the upper or coarse windings may be varied by the manipulation of the controller, as will be hereinafter explained. The upper winding of each of said solenoids is so wound that when the current flows therethrough in one direction the two windings of said solenoids tend to produce the same polarity—that is, for instance, if the winding $w'$ of solenoid $w$ tends to produce a north pole at the top and a south pole at the bottom then the lower winding $w^2$ also tends to produce a north pole at the top and a south pole at the bottom; but if the current flows through said upper winding in the reverse direction then said upper winding tends to produce an opposite polarity of the solenoid from that which the winding $w^2$ tends to produce, and therefore said winding $w$ would tend to create at the top a south pole and at the bottom a north pole, while winding $w^2$ would tend to produce a north pole at the top and a south pole at the bottom. In the first instance when the windings of the solenoid tend to produce the same polarity one winding would assist the other and the solenoid would raise its core; but when said windings tend to produce opposite polarities then the solenoid would remain inert and its core would not be lifted, as the field excited by one winding would neutralize or destroy the effect of the field excited by the other. The upper or coarse windings $w'$, $x'$, $y'$, and $z'$ of the several solenoids are such that when the current flows on the controlling-circuit in one direction the windings $w'$ and $y'$ will tend to produce the same polarity as their corresponding windings $w^2$ and $y^2$, respectively, and therefore the solenoids $w$ and $y$ will be energized and lift their cores, while the windings $x'$ and $z'$ will tend to produce opposite polarities to the windings $x^2$ and $z^2$, and therefore the solenoids $x$ and $z$ will remain inert and not lift their cores or plungers. If the current be reversed upon the car-circuit, then the action of the solenoids of the reversing-switches will be reversed, or the solenoids $w$ and $y$ will remain inert while the solenoids $x$ and $z$ will be energized.

To effect the reversal of the flow or polarity of the current on the controlling-circuit, the arm of the controller is made so as to be movable in different directions from the central or initial position, and when it is moved upwardly—say in the direction of the arrow— then the current flows on the controlling-circuit in a reverse direction to that which it would if the arm were moved downwardly.

In movement of the arm of the controller in either direction the greatest amount of resistance is included in the controlling-circuit by said controller when the brush $k^{11}$ engages the first contact of either of the sets of contacts $k^5$ or $k^6$. As the arm is further passed from its normal position the sections of the resistance included in circuit are cut out one by one as the brush $k^{11}$ engages the successive contacts. Of course as the resistance is removed from circuit the current on the controlling-circuit is increased. Therefore, it will be noted that the current upon the controlling-circuit may be varied at will by the manipulation of the controller-arm, and the direction in which said current is flowing upon said circuit will depend upon the side to which the controller-arm is moved from its initial position.

With each of the several solenoids referred to in this system is arranged a switch $l$, adapted to close a shunt-circuit around the solenoid with which it is associated, and in said shunt-circuit is connected a resistance $l'$, which when the shunt-circuit is closed will protect its solenoid from excessive currents. The switches $l$ are so located that they are actuated to close the shunt-circuits by pins upon the plungers of the solenoids when said solenoids are energized.

Between the plungers or cores of the solenoids $w$ and $x$ of one reversing-switch is preferably arranged in practice an interlocking lever or other means to insure the lowering of one core when the other core is raised, and normally the two cores set in an intermediate position. A similar interlocking mechanism or lever is arranged between the plungers $y$ and $z$ of the other reversing-switch.

The solenoids $s$ and $p$ of the series and parallel switches are wound so that a larger current will be required to energize the solenoid $p$ than the solenoid $s$. Between the plungers or cores of these solenoids is also preferably situated in practice an interlocking mechanism like that of the plungers of the solenoids of the reversing-switches, save that said interlocking mechanism between the plungers of the solenoids $s$ and $p$ permit a slight freedom of movement of the plunger of the solenoid $p$. One form of interlocking lever which may be employed between the plungers of the series and parallel solenoids is diagrammatically shown in Fig. 3.

The plungers or cores of each of the solenoids carry suitable contact devices or brushes, which are arranged to bridge the terminals of their switches, and these contacts and terminals I will now designate by reference characters. The plungers or cores of each of the solenoids of the reversing-switches carry at both their lower and upper ends a contact which is adapted to bridge suitable terminals when the plunger is raised. The core of solenoid $w$ carries at its upper end contact 27, adapted to bridge terminals 28 and 29, and at its lower end a contact or brush 30, adapted to bridge terminals 31 and 32. At the upper end of the core of solenoid $x$ is a contact 33, arranged to engage terminals 34 and 35, and at the lower end of said plunger is a contact 36, situated so as to engage terminals 37 and 38 when the plunger is raised. The plunger of the solenoid $y$ has contact 39 at its upper end for connecting terminals 40 and 41 and a contact at its lower end adapted to bridge the terminals 43 and 44. The contact 45 at the upper end of the plunger of solenoid $z$ is adapted to bridge terminals 46 and 47, and the contact 48 at the lower end of said plunger is arranged to connect terminals 49 and 50. The resistance-solenoids $r'$, $r^2$, $r^3$, and $r^4$ each have a contact upon the plunger of their solenoid, which is arranged to bridge suitable terminals for cutting out sections of resistance. The plunger of solenoid $r'$ has contact 51 adapted to bridge terminals 52 and 53 to cut out a section of the resistance from one motor, and the plunger of solenoid $r^2$ has contact 54 adapted to bridge terminals 55 and 56, so as to cut out another section of the resistance from said motor. The solenoid $r^3$ has its plunger provided with a contact 57, arranged to bridge when raised the terminals 58 and 59, so as to cut from the circuit of the armature $c$ of the other motor a section of the resistance therefor, and another section of the resistance for the last-mentioned armature is adapted to be removed from the circuit by contact 60, carried by the plunger of solenoid $r^4$ and arranged to bridge terminals 61 and 62. The plunger of the solenoid $s$ of the series switch has at its upper end a contact 63, arranged to bridge terminals 64 and 65 when the plunger is raised, and at its lower end a second contact 66, adapted to bridge terminals 67 and 68 when said plunger is in its upper position. Said plunger also carries another contact, 69, which when the plunger is lowered bridges terminals 70 and 71 in the controlling-circuit. The plunger of solenoid $p$ has at its upper end a contact 72, which when the plunger is raised bridges terminals 73 and 74, and at its lower end a contact 75, which when the plunger is in a similar position bridges the terminals 76 and 77. The plunger of the parallel switch also has at its lower end a contact or brush 78, arranged to bridge terminals 79 and 80 when the plunger is raised, and a brush or contact 81, which is situated so as to connect terminals 82 and 83 when the plunger is in an intermediate position, but to disconnect said terminals when the plunger is completely raised or lowered.

I will now refer to the power-circuits for the motors as shown in Fig. 2. In said figure are shown generally the solenoid-switches for establishing the different relations between the motors and the circuits. In order to more readily disclose these circuits and the operation of the system, I will now follow the power-circuits from the motor. In the first place let it be assumed that the plungers of the solenoids $w$ and $y$ have been energized, so that the contacts carried by their plungers will bridge their respective terminals, and that the solenoid of the series switch is energized. With the switches thus closed the current will flow from trolley T by wire 84 to terminal 28 of the reversing-switch. Thence it will cross the contact 27 to terminal 29 and flow to terminal 37. From here it will pass over wire 85 to the armature $a$ and after traversing said armature will be conducted by the wire 86 to the terminal 32. By crossing the bridge or contact 30 to terminal 31 it will flow over conductor 87, through the field $b$, and over wire 88. From wire 88 it will cross sections $r^5$ and $r^6$ of the resistance for the armature $a$, controlled by solenoids $r'$ and $r^2$. Thence it will pass by conductor 89 to terminal 68 of the series switch, and cross the contact 66 thereof to the terminal 67, whence it will be conducted by wire 90 to the terminal 64 of said series switch and cross from said terminal by contact 63 to terminal 65. Now it will pass over conductor 91 and flow through sections $r^7$ and $r^8$ of the resistance for the armature of the motor $c$, which are controlled by solenoids $r^4$ and $r^3$, respectively, to the wire 92. After traversing the field $d$ from the wire 92 the current will flow through the wire 93 to terminal 43 of the reversing-switch for the armature of the motor $c$ and pass by contact 42 to terminal 44. From terminal 44 it will pass by wire 94 to the armature $c$, and after traversing said armature, it will flow by wire 95 to terminals 49 and 41 of the reversing-switch for said armature. The current will then cross contact 39 to terminal 40 and thence flow over conductor 96 to the ground G.

If the solenoids $x$ and $z$ of the reversing-switches be energized, then the current will flow through the armatures of the motors in the reverse direction and cause an opposite rotation thereof. In this instance the current will flow from terminal 28 of the reversing-switch of the armature $a$ over wire 97 to terminal 35 and thence by contact 33 and terminal 34 to terminal 32. From terminal 32 it will flow through wire 86, armature $a$, and wire 85 in the reverse direction to that which it did before. After reaching terminal 37 by wire 85 it will cross contact 36 and thence pass from terminal 38 to terminal 31. From here it will pursue the same course as before until it reaches the terminal 43 of the other reversing-switch. From terminal 43 it will pass to terminal 50 and thence through contact 48 to terminal 49. From terminal 49 it will flow through wire 95, armature $c$, and wire 94 in the reverse direction to that which it before pursued, and thence after passing through terminals 44 and 46 it will cross the bridge or contact 45 to terminal 47, whence it will follow conductors 97 and 96 to the ground.

As before stated, the solenoid $r'$ controls section of resistance $r^5$. The terminals of the switch controlled by said solenoid are situated in a shunt-path around said section of the resistance, so that when the contact bridges said terminals the section $r^5$ of the resistance is removed from circuit. The terminals of each of the other switches are similarly arranged in shunt-paths around one or the other different sections of the resistances, so that each solenoid-switch controls a section of the resistance for one or the other of the armatures $a$ and $c$. As before stated, the sections $r^5$ and $r^6$ of one resistance are for armature $a$, and therefore when the solenoids $r'$ and $r^2$ are energized these sections are removed from the circuit of the armature $a$. So, likewise, when the solenoids $r^3$ and $r^4$ are energized the sections $r^7$ and $r^8$ of the other resistance are removed from the circuit of the armature $c$.

If the parallel switch be closed instead of the series switch by the energization of the solenoid $p$, then the current after traversing the armatures $a$ and field $b$ by the paths heretofore disclosed will flow from terminal 76, connected to wire 89, across bridge 75 to terminal 78, and thence by wire 98 to the ground. The current from the other motor will flow from the wire 97, connected with the trolley, over wire 99 to terminal 74, and after crossing contact 72 to terminal 73 it will flow by wire 91 through the same path before traced from the armatures $c$ and field $d$ to the ground G.

The motor-circuits having now been explained, I will refer to the controlling-circuits (shown in Fig. 1) and describe how the different solenoids are actuated from the controller and the operation thereof when the controller is being manipulated. Let it be assumed that six amperes are required for the energization of the solenoids of the reversing-switches. Then when the controller-arm has been moved sufficiently to cut out enough resistance to give a current upon the controlling-circuit of six amperes one of the solenoids of each reversing-switch will be energized, while the other solenoid of each reversing-switch will remain inert by reason of their construction, as heretofore explained. Let it be assumed in this instance that the controller-arm has been moved to the side thereof which will send the current upon the controlling-circuit in a direction to energize the solenoids $w$ and $y$. Of course if it be desired to energize the solenoids $x$ and $z$, so as to produce a reverse movement of the armatures of the motor, then the said controller-arm would be moved to the opposite side. The solenoid $s$ of the series switch also responds under a current of six amperes. With the series and reversing switches thus closed the motors will be started and run in series. It is then time to remove the resistance from the armatures of said motors, and therefore the controller-arm will be further moved, so as to increase the current upon the controlling-circuit to nine amperes, under which amperage the solenoids $r'$ and $r^3$ will respond. On a still further increase of the current to eleven amperes the solenoids $r^2$ and $r^4$ will close their switches, and then all the resistance will be removed from the circuits of the armatures. At this stage of running the motors when they have acquired their speed it is desirable to run them in parallel. The solenoid $p$ is wound to respond to a current of fifteen amperes, and therefore the controller-arm is moved to the succeeding contacts of its resistance until the amperage upon the car-circuit has been increased to fifteen amperes, so as to energize the solenoid $p$, whereupon its core will lift, and the switch in the motor-circuit controlled thereby will be closed. At an intermediate position of the plunger of the parallel solenoid in being raised the contact 81 carried thereby bridges terminals 82 and 83 and closes a shunt-path 100 around the resistance-solenoids $r'$, $r^2$, $r^3$, and $r^4$ and solenoid $s$ of the series switch. Thereupon the current in these solenoids is so reduced that they drop their cores. The interlocking lever employed in practice between the plungers of the series and parallel solenoids gives the plunger of the parallel solenoid sufficient freedom of movement to permit it to close the shunt-path around the series solenoid before said lever is actuated by the parallel solenoid to lower the plunger of the series switch. When the plunger of the parallel switch has been raised completely, connection between the terminals 82 and 83 by contact or brush 81 has been broken, and a new shunt-path 101 around all of the solenoids upon the controlling-circuit, save the parallel solenoid $p$, is established by the contact 69 on the plunger of the series switch, which engages terminals 70 and 71 when the series plunger is lowered, and the contact 78 upon the plunger of the parallel solenoid, which bridges terminals 79 and 80. A path 102 is established by contact 78 and terminals 79 and 80 of the parallel switch, so as to separately shunt the solenoid $s$ of the series switch. In the shunt-path 101 is situated a resistance $o$, and with this resistance connected in the relation described a further increase of the total current upon the controlling-circuit—say to eighteen amperes—will be required before the solenoids $r'$ and $r^3$ again respond to cut the sections of resistance controlled by their switches from the circuits of the motors, and a still further increase of the current upon the controlling-circuits to twenty-two amperes will be required before the solenoids $r^3$ and $r^4$ are energized and cut out the respective sections of resistance controlled thereby. With the resistance $o$ in circuit the current will divide between said resistance and the solenoids in parallel therewith, and approximately half of the total current on the controlling-circuit will flow through each.

In the first part of this specification it was stated that two controllers are preferably arranged in each car. This is so that the car may be operated from either end, and the controllers are preferably connected in circuit in such a manner that corresponding movements of the controller-arms will produce similar movements of the train from the standpoint at which it is being operated—that is, if movement of the controller-arm to the right at one end of the car will produce a forward movement thereof then a similar movement of the controller-arm at the other end of said car will produce an opposite movement of the car. The car is also provided with a train-line composed of wires 103 and 104 for passing the current from one car to the other, so that the motors upon each of the several cars may be controlled from a single master-controller situated at the forward end of the front car. The train-line upon each car is provided with suitable couplings at its ends, so that it may be connected to the train-lines of the cars to which it is coupled. These couplings are preferably of such form that they will always connect the same wires of the train-lines. The wire 103 of the train-line is connected by wire 105 with the wire 18, and the wire 104 is connected by the wire 106 with the wire 19, so that the train-line is supplied with current from the ground G through the wires 18 and 19. Suitable switches 107 are preferably interposed in the wires 104 and 105 to permit the train-line and controlling-circuit to be disconnected from each other, if desired. It will be readily understood how the controlling-circuits of several cars in a train may be supplied with current from the motor or forward car, and said current being supplied to said controlling-circuit from the motor-car its polarity and strength will be completely within the control of the operator of the master-controller at the forward end of the front car.

In the system disclosed the motors can be perfectly controlled from the single master-controller, and by reason of placing or connecting the different windings in series uniformity of action in the system will be insured. As the power-circuit is supplied with current from the main line, which carries a large current, the current-carrying parts of the system and controller will necessarily be made larger than would be the case if the current were supplied from a generator or other source upon the car.

The system which I have disclosed is only one form of my invention, and it may therefore be changed in many ways. The system is equally applicable for controlling motors which are employed for other purposes than operating motor-vehicles, and the windings may be used to operate or control other instrumentalities than the elements of an electric-motor controller. Therefore it will be understood that I do not limit myself to the details of construction which I have herein shown and described merely for the purpose of setting out my invention to those skilled in the art.

I claim—

1. The combination with a controlling-circuit, of a plurality of electromagnetic windings connected therewith in series, means for varying the polarity and strength of the current upon said controlling-circuit to selectively actuate said electromagnetic windings, and the elements of an electric-motor controller operated by said windings.

2. The combination with a controlling-circuit, of a plurality of electromagnetic windings connected therewith in series, a reversing-switch and motor-speed-varying instrumentalities controlled by said windings, and means for varying the electrical conditions on said controlling-circuit to selectively actuate said windings.

3. The combination with a controlling-circuit, of a plurality of electromagnetic windings adapted to respond to currents of different character and connected therewith in series, suitable instrumentalities arranged to be controlled by said windings, and means for varying at will the polarity and other characteristics of the current supplied to said controlling-circuit to selectively actuate said windings.

4. The combination with a supply or power circuit, of a controlling-circuit, a plurality of electromagnetic windings adapted to respond to different current conditions and connected with said controlling-circuit in series, and suitable means for transforming the current from said supply-circuit as to strength and polarity into a current suitable for use upon said controlling-circuit to selectively actuate said electromagnetic windings.

5. The combination with a suitable supply-circuit, of a controlling-circuit connected therewith, a plurality of electromagnetic windings arranged in series in said controlling-circuit and responsive to currents of different strengths, suitable instrumentalities controlled by said windings, and means for varying at will the strength and polarity of the current upon said controlling-circuit.

6. The combination with a suitable supply-circuit, of a controlling-circuit connected therewith, a plurality of electromagnetic windings arranged in series in said controlling-circuit and responsive to currents of different strengths, an electric-motor controller controlled by said windings, and means for varying at will the strength and polarity of the current upon said controlling-circuit.

7. The combination with a supply-circuit, of a controlling-circuit connected therewith, a plurality of electromagnetic windings arranged in series in said controlling-circuit, an armature-resistance controlled by said windings, a reversing-switch also controlled by said windings, and means for varying at will the strength and polarity of the current upon said controlling-circuit.

8. The combination with a suitable supply-circuit, of a controlling-circuit connected therewith, a plurality of electromagnetic windings arranged in series in said controlling-circuit and responsive to variations in the strength of the current upon said controlling-circuit, an armature resistance controlled by said windings, a reversing and a series-parallel switch also controlled by said windings, and means for varying at will the strength and polarity of the current upon said controlling-circuit.

9. The combination with a suitable supply-circuit, of a controlling-circuit, a plurality of electromagnetic windings arranged in series in said controlling-circuit and responsive to variations in the strength of the current upon said controlling-circuit, an armature resistance controlled by said windings, a series and a parallel switch also controlled by said windings, said parallel switch being adapted to control the current which traverses the windings controlling said armature resistance and said series switch, and means for varying at will the strength and polarity of the current upon said car-circuit.

10. The combination with a suitable supply-circuit, of a controlling-circuit connected therewith, a plurality of electromagnetic windings arranged in series in said controlling-circuit and responsive to variations in the strength of the current upon said controlling-circuit, an electric-motor controller having its elements controlled by said windings, and conductive means for varying at will the strength and polarity of the current supplied to said controlling-circuit from said supply-circuit.

11. The combination with a suitable power or supply circuit, of one or more electric motors connected therewith, a controlling-circuit connected with said power-circuit, a plurality of electromagnetic windings arranged in series in said controlling-circuit and responsive to variations in the strength of the current upon said controlling-circuit, an armature resistance for said motor controlled by said windings, a reversing-switch for said motor also controlled by said windings, the operation of said switch being dependent upon the direction of the flow of the current upon said controlling-circuit, and means for varying at will the strength and polarity of the current upon said controlling-circuit.

12. The combination with a suitable power or supply circuit, of two or more electric motors connected therewith, a controlling-circuit also connected with said power-circuit, a plurality of electromagnetic windings arranged in series in said controlling-circuit and responsive to variations in the strength of the current on the said controlling-circuit, an armature resistance for said motors controlled by said windings, and switches for connecting said motors in a series or parallel relation also controlled by said windings, and means for varying at will the strength and polarity of the current upon said controlling-circuit.

13. The combination with a suitable power or supply circuit, of two or more electric motors connected therein, a controlling-circuit connected with said power-circuit, a plurality of electromagnetic windings arranged in series in said controlling-circuit and responsive to variations in the strength of the current upon said controlling-circuit, an armature resistance for said motors controlled by said windings, a reversing and a series-parallel switch also controlled by said windings, said series-parallel switch being adapted to connect said motors either in series or parallel relation, and the operation of said reversing-switch being dependent upon the direction of the flow of the current upon the controlling-circuit, and conductive means for varying at will the strength and polarity of the current upon said controlling-circuit.

14. The combination with a suitable circuit, of a plurality of electromagnetic windings connected therewith in series and adapted to respond to currents of different character, means for varying the character of the current upon said circuit, and means for protecting the responding solenoids from an excessive current.

15. The combination with a suitable circuit, of a plurality of electromagnetic windings connected therewith in series and adapted to respond to currents of different character, means for varying the character of the current upon said circuit, and means for connecting a shunt round each responding solenoid.

16. The combination with a controlling-circuit, of a plurality of electromagnetic windings connected therewith in series and adapted to respond to currents of different character, means for varying the character of the current upon said controlling-circuit, and switches adapted to connect a resistance in shunt round each responding solenoid.

In witness whereof I have hereunto subscribed my name in the presence of two witnesses.

HENRY H. CUTLER.

Witnesses:
T. E. BARNUM,
F. R. BACON.